Patented Oct. 1, 1940

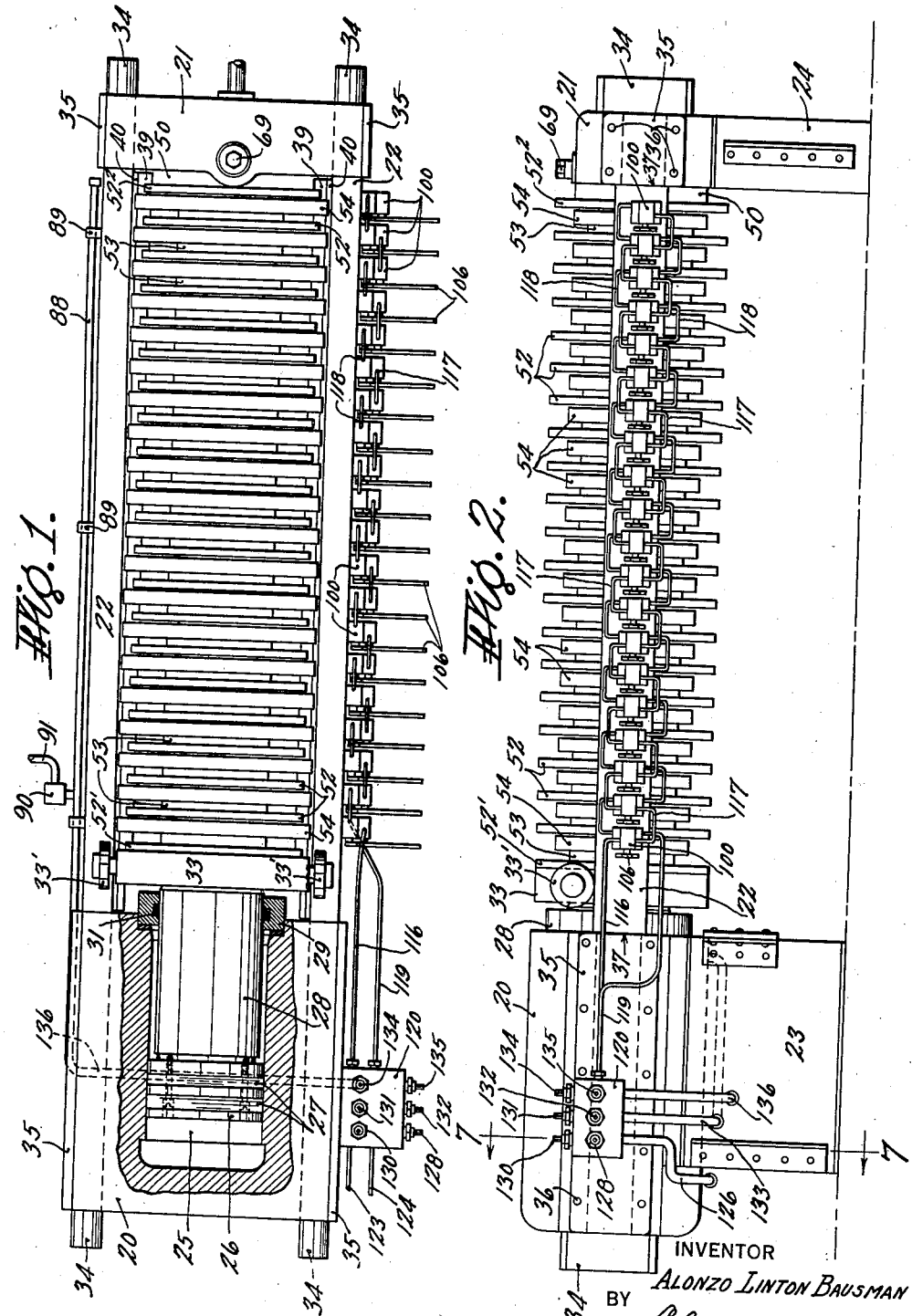

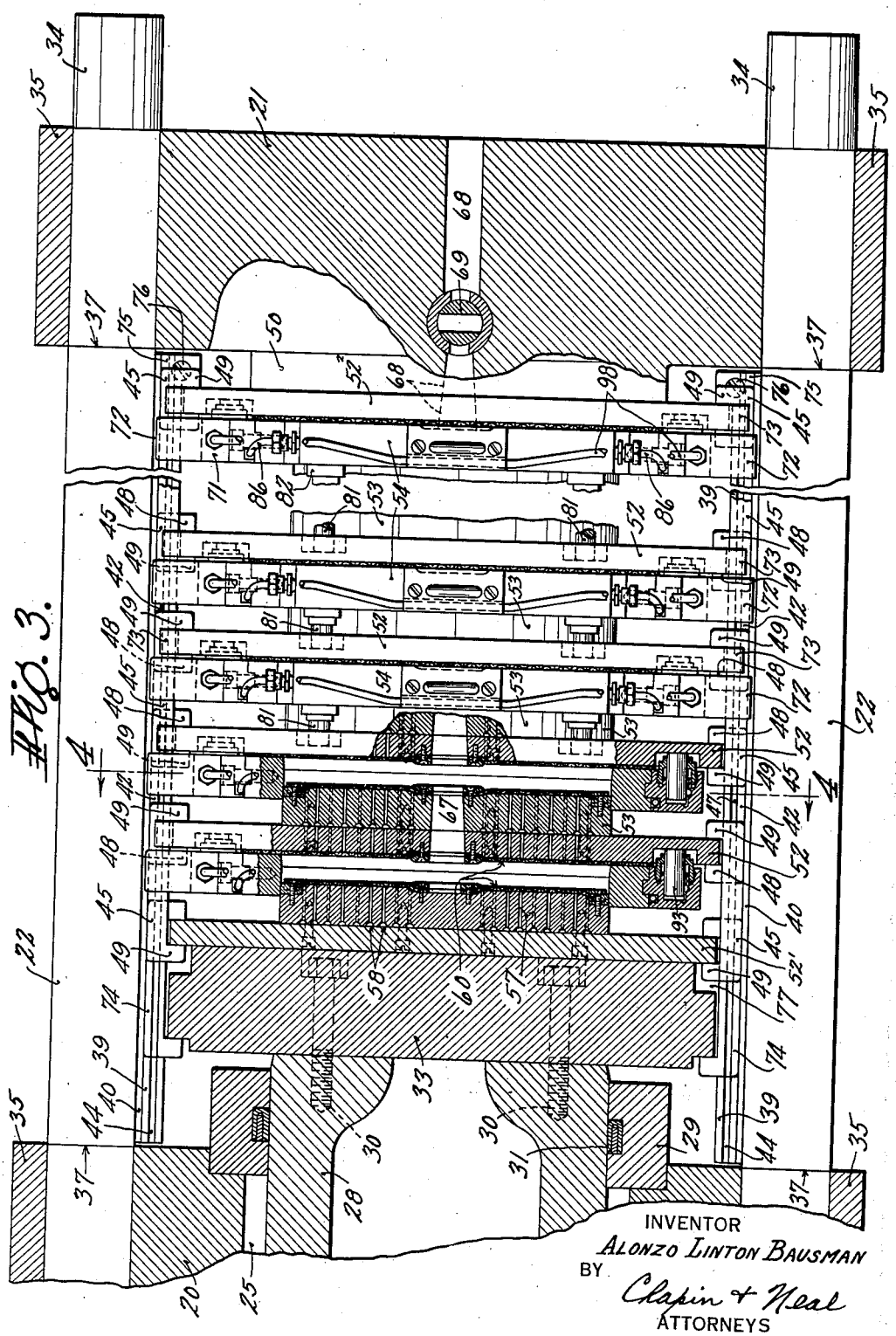

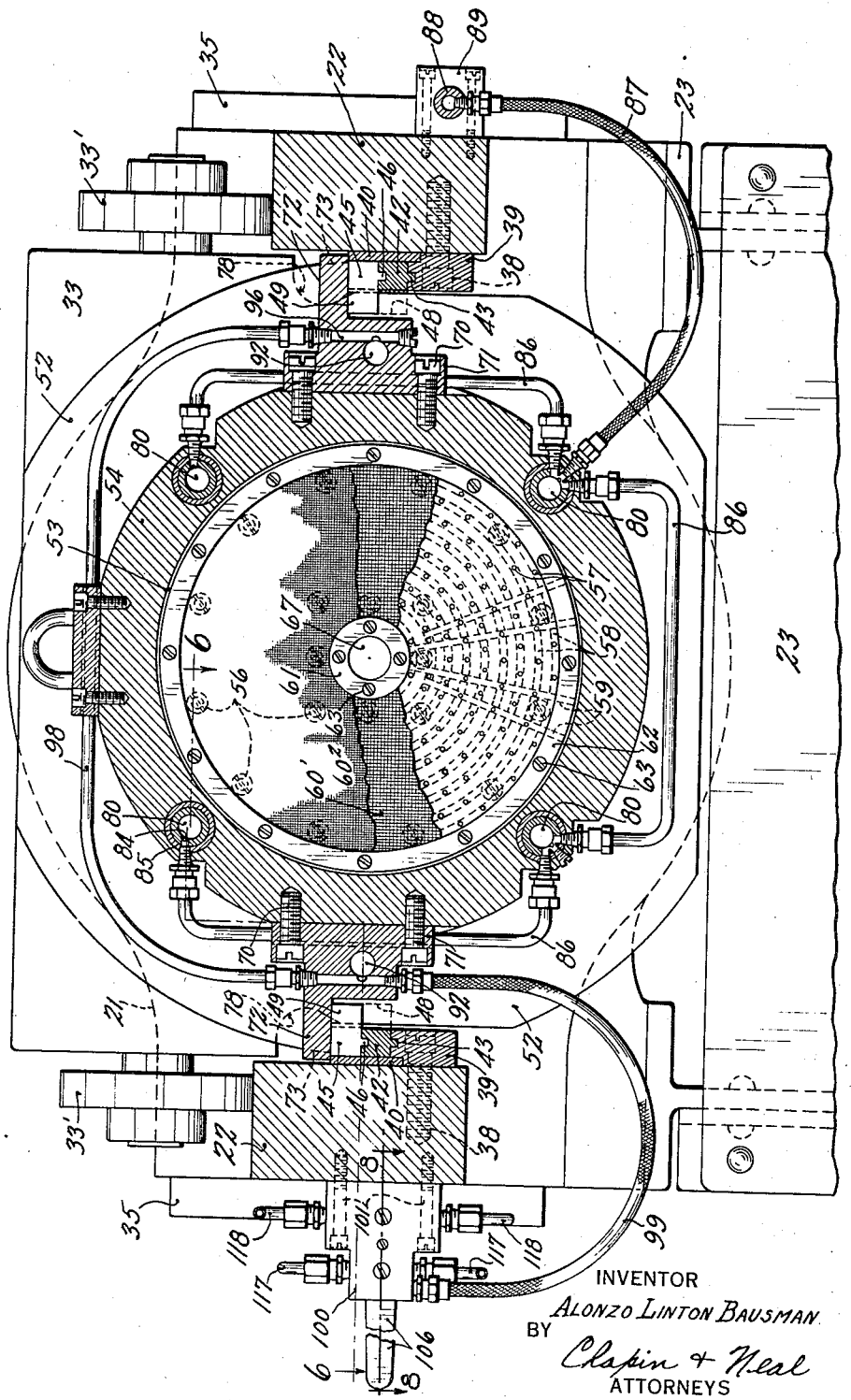

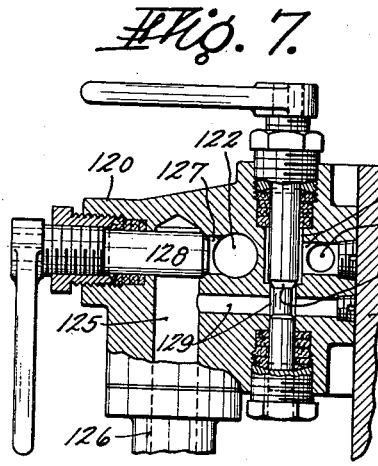
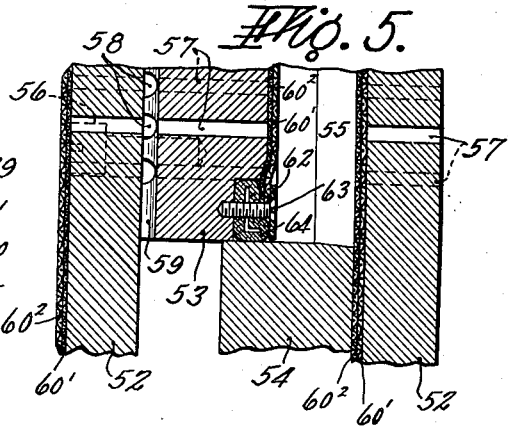
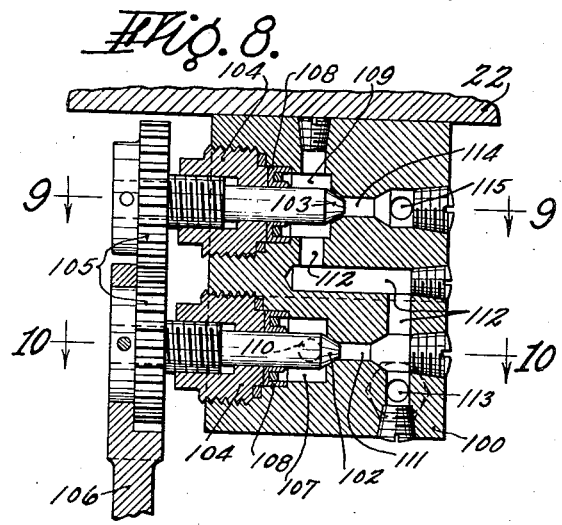
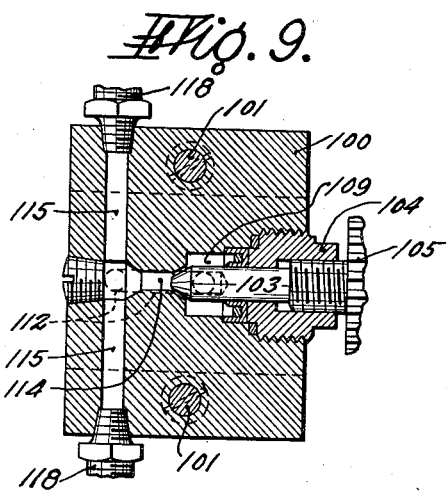
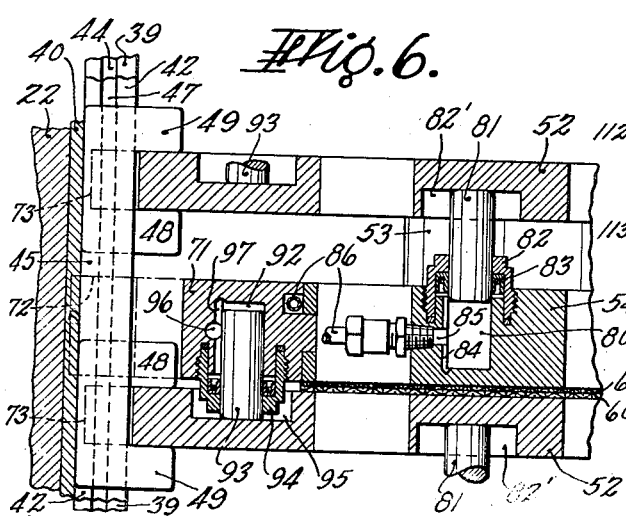
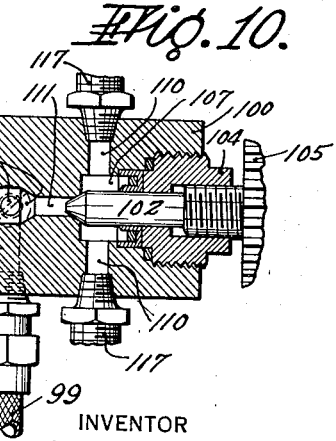

2,216,484

UNITED STATES PATENT OFFICE 2,216,484

FILTER PRESS

Alonzo Linton Bausman, Springfield, Mass., assignor to National Equipment Company, Springfield, Mass., a corporation of Massachusetts Application August 5, 1937, Serial No. 157,590

9 Claims. (Cl. 100—50)

This invention relates to improvements in filter presses, such as are used for the purpose of separating the liquid constituents from the solid constituents of various materials in a semifluent state. An example of one use of a press of this type is in extracting cocoa butter from cocoa liquor, leaving as a solid residue cocoa in the form of cakes.

A press of this type customarily includes a plurality of pressing units mounted in column form between the ram and the resistance head of a hydraulic press. Each pressing unit includes a cylindrical chamber formed within a ring; a plunger movable in the chamber to effect the pressing operation; and a plate fixed to the plunger. The pressing chamber of each unit is normally closed at one end by its plunger and at the other end by the plate of the next unit. The adjacent faces of such plate and plunger carry filter pads through which the liquid constituent passes to be conducted out of the press through channels provided in the plate and plunger. The several pressing chambers of the press are interconnected so that the semi-fluent material may be pumped from one chamber into another until all are filled. Such a press is operated by pumping in the material, such as cocoa liquor, while the plungers are held retracted in their chambers until all the chambers are filled with the material under heavy pressure. Cocoa butter flows through the filter pads during the pumping operation and pumping is continued until a sufficient cake forming mass has been built up in the chambers within the rings. Then the pumping of liquor is stopped and the feed passage closed, after which the plungers are moved into their rings to express additional butter through the filter pads and press the solid constituents into cakes within the rings. After this expressing operation has ended, the cocoa cakes have to be removed from the rings and the press units moved back into position for a subsequent filling operation.

This invention has for one object the provision of a press of this kind, which can be operated speedily without requiring much manual effort, and in particular, without requiring the time consuming manual labor formerly necessary to remove the cakes from the press and recondition the press for a subsequent filling operation.

The invention has for another object to provide an improved means for holding each plunger in retracted position in its ring, such means acting not only as a spacer between the plate and ring of one unit but also to press the ring against the plate of the next pressing unit to close the pressing chamber in a liquid tight manner.

The invention has for another object the provision of individual power-operated jacks for each press unit for shifting the rings into telescoped relation with the plungers to allow the pressed cakes to drop.

The invention has for another object the provision of similar jacks for restoring the rings after they have been telescoped, as described.

The invention also has for an object to provide a single means for each press unit which means is effective to space apart the plate and ring of each press unit during filling of the press and also to restore the rings after they have been telescoped to drop the pressed cakes.

The invention has for a further object the provision of means operated by fluid under pressure to move the rings against the plates for closing the pressing chambers during the filling operation characterized in that the means are operable without the limitation of a fixed stroke to force the ring into tightly sealed engagement with the plate.

Other objects will appear as the detailed description proceeds.

The invention will be disclosed with reference to the accompanying drawings, in which:

Figs. 1 and 2 are small scale plan and elevational views, respectively, of a press embodying the invention;

Fig. 3 is a fragmentary plan view, partly in section, and drawn to a larger scale, showing the ram operated plate-spacing means and the fluid pressure operated ring-shifting means;

Fig. 4 is a cross sectional view taken on the line 4—4 of Fig. 3;

Fig. 5 is a large scale, fragmentary sectional elevational view of one of the press units;

Fig. 6 is an enlarged fragmentary sectional plan view taken on the line 6—6 of Fig. 4, showing the hydraulic jacks for shifting the rings on their plungers;

Fig. 7 is a cross sectional view taken on the line 7—7 of Fig. 2 and showing one set of control valves for the ram of the press;

Fig. 8 is a sectional view taken on the line 8—8 of Fig. 4, and the control valve unit for the hydraulic jacks which telescope the rings over the plungers of the press units to drop out the pressed cakes; and Figs. 9 and 10 are sectional views taken on the lines 9—9 and 10—10 respectively of Fig. 8.

Referring to these drawings, and first to Figs. 1 and 2 thereof, the press proper includes fixed heads 20 and 21, interconnected by two laterally spaced, longitudinally-extending horizontal bars 22 which maintain the two heads longitudinally spaced one from another. The heads 20 and 21 are supported at the desired level above the floor by suitable standards 23 and 24 (Fig. 2); respectively, to which the heads are suitably fixed. The head 20 is the pressure head and is formed interiorly with a cylinder 25 (Fig. 1), the left hand end of which is closed and in which is slidably mounted a ram, having a piston portion 26 with packings 27 for sealing engagement with the peripheral wall of the cylinder and a hollow barrel-like part 28 which extends out of the cylinder toward the head 21 through a removable cylinder head 29 and is secured as indicated in Fig. 3 by bolts 30 to pressure abutment 33. The barrel 28, where it passes through head 29, is sealed by packing 31 mounted in a groove in the head. Liquid, such as oil under pressure, may be admitted to either end of cylinder 25 to move the ram in either direction. For moving the ram on its forward stroke (toward head 21), liquid is admitted to the left hand end of cylinder 25 while the right hand end thereof is connected to exhaust. The liquid under pressure then acts on the full cross sectional area of piston 26 to produce the heavy total pressure required for the pressing operation. For the return stroke, liquid under pressure is admitted to the right hand end of cylinder 25 while the left hand end thereof is connected to exhaust. The effective area of the right hand face of piston 26 is relatively small and a much lower but sufficient total pressure is developed to return the ram after the pressing operation.

Each tie bar 22 has T-heads 34 (Fig. 2), one at each end thereof, with which the outer ends of the heads 20 or 21, as the case may be, abut, whereby the heads are held against spreading apart. Each head 20 or 21, as the case may be, is provided on opposite sides with slots, into which portions of the tie bars fit, and the bars are held in place in these slots by plates 35, secured to the head by screws 36. The portions of each tie bar which are received in the aforesaid slots, are of less width than the portions which extend between the two heads, thus affording shoulders 37 for engagement with the inner and adjacent ends of the heads 20 and 21 to prevent them from being drawn toward one another. The follower 33 has rolls 33', one on each side thereof, which rolls ride on the top faces of bars 22 to support and guide the forward end of the follower.

Fixed to the inner side face of each tie bar, as by cap screws 38 (Fig. 4) is a horizontal rail 39 and above the latter an upstanding plate 40. The exposed portion of the upper face of each rail 39 serves as a trackway for slidably supporting a series of links 42, which have tongues 43 engaged in a correspondingly shaped groove 44 in the rail. A second series of links 45 are provided, such links being superposed on the links 42 and having tongues 46 slidably engaged in correspondingly formed grooves 47 in links 42. The outer vertical faces of the links 42 and 45 lie adjacent but do not necessarily engage the plate 40. Projecting from and at right angles to the inner vertical face of each link 42, one at each end thereof, are lugs or hook-like ends 48, and the links 45 have similar hook-like ends 49. These links serve to support the plunger-bearing plates of the press units for sliding movement in a direction parallel to the axis of the ram. The links act as weight-bearing shoes or runners giving an extended area of bearing surface over that which would exist if the plates rested directly on the rails. The links are also used for the purpose of drawing apart the plunger-bearing plates into predetermined longitudinally spaced relation as will later appear.

The press units, of which twenty are shown in Figs. 1 and 2, are mounted in coaxial relation and in column form between the follower 33 and an abutment 50 on the resistance head 21. This series of units lies between the tie bars 22 and are slidably supported therefrom through the intermediary of the links described. Each press unit consists of a plate 52 (Figs. 3 and 4), a plunger 53 fixed thereto, and a ring 54 in which the plunger is slidably engaged. Within the ring is a pressing chamber 55. All rings 54 are of like construction. All the plungers 53 are of like construction except for the first one of the series 15 which has no supply passage therethrough. All the plates 52, except for the two end plates of the series, which end plates are marked 52' and 52², are of like construction. Each plunger 53 is secured, as by cap screws 56, to one face of a plate 52, the first plunger of the series being fixed to plate 52' which is imperforate. Except for plate 52', all the plates and all the plungers are perforated, each having a large number of small holes 57 therethrough, such holes being arranged in a plurality of circular series. That face of each plunger which abuts a plate 52 is formed with a plurality of coaxially disposed, circular grooves 58, each serving to interconnect all the holes 57 of one series. In a lower sector of the last named face of each plunger 53 are several radial grooves 59 (see also Fig. 5) for connecting the circular grooves 58 to the lower portion of the outer periphery of the plunger.

Each plunger 53 and each plate 52 and plate 52² carries a suitable filter pad 60, one on each of the exposed and non-abutting faces. These pads may consist of metallic screens, such as an inner screen 60' (see also Fig. 5) of relatively coarse mesh and an outer screen 60² of very fine mesh. The filter pad on the plunger is held in place by inner and outer rings 61 and 62 secured as by screws 63. A suitable packing 64, such as camel's hair, is mounted beneath the inner screen and held in place by the outer ring 62—such packing serving as a peripheral seal between the plunger 53 and the ring 54 in which it slides. The filter pad on plate 52 is similarly secured and it is larger in diameter so that its marginal portion may be clamped between the plate and ring 54, when the press chambers are closed in a manner later to be described. The plate 52' carries no filter pads. The plate 52² is like plate 52 except that the face which abuts head 50 is formed with circular and radial grooves, like the grooves 58 and 59, respectively. Each plunger 53, except the first one of the series, has an axial opening 67 therethrough, whereby all the press chambers 55 are interconnected.

The liquor, from which the cocoa butter is to be extracted is pumped into the pressing chambers 55 through in axial passage 68 (Fig. 3) formed in head 21 and extending through plate 52². The usual valve 69, mounted in head 21, serves to open this supply passage during filling of the press chambers and to close the passage during the pressing operation when the plungers move into the rings.

Referring now to Fig. 4, each ring 54 has secured thereto as by cap screws 70, a pair of brackets 71, one on each side thereof, and each bracket has a lug 72, extending outwardly therefrom. Each lug extends across the top of the adjacent upper link 45 and rests thereon, and its outer end rests on the upper edge of the plate 40. Each ring is thus slidably supported for movement longitudinally of the press. The plates are supported by lugs 73, which extend outwardly one from each side of the plate and rest on the upper face of the adjacent link 45. In Fig. 6, these lugs 72 and 73 are indicated by dotted lines. Below each of these lugs 73 the plate extends downwardly through the space between the hook ends 49 of the adjacent link 45 and through the space between the hook ends 48 of the underlying and adjacent link 42, each plate except the two end ones of the series being engaged on one face by a hook 49 and on the other face by the hook 48 (Figs. 3 and 6). The end plates $52^1$ and $52^2$ are each engaged only by hooks 49. The plate $52^1$ is fixed to the follower 33 by links 74, which are made like the links 42 and 45 but here function only as clips to tie the plate 52′ to the follower. Links 74 ride on rails 39 and each partially supports the adjacent link 45. Below each link 45 of the last pair of the series are clips 75, which are notched to receive and closely fit plate $52^2$ and which are secured, as by cap screws 76, to rails 39. These clips serve as a convenient means for holding the end plate $52^2$ to the abutment 50. The links 42 and 45 of each set constitute a linkage which interconnects the several plates of the series, enabling them to move toward one another during the expressing operation and serving to move them into the predetermined spaced relationship shown in Fig. 3 on the return stroke of the ram.

It is to be noted that clearance spaces 77 are provided in the follower 33 to enable the first pair of links 45 to move relatively to plate 52′. From Fig. 4 it will also be seen that the follower 33 is recessed at 78 on opposite sides at locations just above the part which is engaged with clips 74. These recesses 78 enable the clips 74 to be put in place. Each clip with the hook ends thereof pointing downwardly is slid endwise into a recess 78 and then turned ninety degrees until it lies on rail 39 with its hooked ends engaged one with the follower 33 and one with plate 52′.

When the several plates of the series are drawn out into the aforesaid relationship, the several pistons are retracted in their rings 54 and the press is conditioned for the operation of filling the press chambers 55. It is necessary, however, to hold the several rings and plungers in the positions shown in Fig. 3 and to secure liquid-tight closures of the several chambers by pressing the ring 54 of each unit tightly against the plate 52 of the next unit or in the case of the extreme right hand plunger, against the plate $52^2$. For this purpose, jack devices operated by fluid under pressure, preferably by oil, are provided, operatively interposed between the ring and plate of each unit. As shown in Fig. 4, the ring 54 is provided with four cylinders 80 arranged in a circular series and equally spaced one from another with their axes in parallel relation with the axis of the ring. As shown in Fig. 6, each cylinder 80 slidably receives a piston 81, the outer end of which extends through a head 82, screwed into the ring 54 and a packing 83, held in place by the head. A recess 82′ is formed in plate 52 to allow entry of head 82. A small groove 84 is formed in the peripheral wall of each cylinder 80 and extends from end to end thereof. Liquid under pressure, supplied through a lateral passage 85 in the ring, enters groove 84 and passes to the inner end of the cylinder behind the piston 81 to move the same. Some liquid also passes to the outer end of the cylinder and inside head 82 to press the packing 83 tightly against the periphery of the piston and the inner peripheral wall of head 82 to provide tight seals against leakage of liquid.

The feed passages 85 of all the cylinders 80 are interconnected, as shown in Fig. 4, by pipes 86 and a flexible pipe 87 connects one of these cylinders to a manifold 88, supported by brackets 89 from one of the tie bars 22. There is one pipe 87 for each ring 54 and all these pipes 87 connect with the manifold 88. When the ram is drawn back to separate the plates 52 and uniformly space them in the relationship shown in Fig. 3, the pistons 81 may all be simultaneously actuated by admitting fluid under pressure to the manifold 88. The pistons 81 in each ring 54 will move until their outer ends engage the plunger bearing plate 52 of one press unit and thereafter the liquid pressure will move the ring 54 tightly against the other plate of the unit and hold it there with a tightly sealed joint between the meeting faces of such plate and ring. The links 42 or 45, as the case may be, limit the extent of separation of each pair of adjacent plates and thus the extent of movement of the pistons 81 in their cylinders 80. These pistons 81 thus serve to close the press chambers 55 and hold them closed during the operation of filling the chambers with the cocoa butter or other material to be treated.

It is preferred to provide a relief valve 90 (Fig. 1) connected to the manifold 88 and designed to open when the liquid in the manifold exceeds a predetermined pressure in order to relieve such pressure by by-passing some of the liquid to a pipe 91. This pipe 91 may lead back to the source of liquid supply. This valve 90 is not provided merely for the ordinary safety function. Here, it plays an important part in the combination. It enables the pressing operation to be initiated without first relaxing the pressure which holds the press chambers closed and tightly sealed. That is, with the cylinders 80 filled with liquid under pressure to hold the rings 54 against their plates, as shown in Figs. 3 and 6, the ram may be moved to the right to initiate the pressing action by forcing the plungers 53 into their respective rings. Such action moves the plates 52 closer together and this causes liquid to be expelled through relief valve 90 into the by-pass 91. The pressure in cylinders 81 is, however, maintained during the pressing operation. In this way, tight sealing of each press chamber is insured and this result could not be secured if the cylinders 81 were connected to exhaust prior to operation of the ram.

At the end of the pressing operation, the ram is moved back to spread the plates 52 and bring them back into the relationship shown in Fig. 3. It is then desired to telescope the rings 54 over their respective plungers 53 to allow removal of the pressed cocoa cakes. For this purpose, individual jacks, each operated by fluid under pressure, are operatively interposed between each ring 54 and the plate 52 against which it was pressed for closing the press chambers. These jacks are constructed in the same way as those above described. Two jacks are provided for each ring 54, located at diametrically opposite points as shown in Fig. 4. Each jack consists of a cylinder 92 (Fig. 6), formed in a ring bracket 71 and receiving a piston 93. Each piston extends outwardly through a head 94 and the exposed portions of head and piston are received in a recess 95 formed in plate 52. A vertical feed passage 96 is formed in ring bracket 71 and this passage intersects cylinder 92 at a point intermediate its ends. A longitudinal groove 97 in cylinder 92 enables communication between passage 96 and opposite ends of the cylinder as and for the purposes heretofore described. The two passages 96 are interconnected by a rigid pipe 98 and one of these passages is connected by a flexible pipe 99 to a control valve mounted in a block 100, fixed, as by screws 101, to one tie bar 22. There is one control valve for each pair of cylinders 92, whereby the shifting of the rings is effected one at a time, successively, under individual manual control.

One of these control valve units is shown in detail in Figs. 8, 9, and 10. The unit includes supply and exhaust valves 102 and 103, mounted side by side in block 100 in parallel relation and in the same horizontal plane. The stems of these valves are threaded into heads 104, which in turn are threaded into block 100. The outer ends of these stems, which extend outside the block, are interconnected by spur gears 105. A handle 106 is fixed to one of these gears. By swinging handle 106, the valves 102 and 103 are simultaneously rotated, but due to the gear connections, they turn in opposite directions. As they are turned in opposite directions, their screw thread engagement in heads 104 causes them to move axially in opposite directions. As shown, the valve 102 is closed and valve 103 is open. If handle 106 is swung upwardly, valve 102 will be opened and valve 103 will be closed.

A cylindrical chamber 107 encompasses valve 102 adjacent its seat in block 100. A packing 108 is forced by pressure of the liquid against the stem and the peripheral wall of the chamber and the inner end face of head 104 to prevent leakage of liquid from the chamber. A similar chamber 109 is provided for valve 103, similarly located and similarly sealed. A supply passage 110 for liquid under pressure, extends vertically through the block 100 and intersects chamber 107. The outlet from the latter is a horizontal passage 111, controlled at one end by valve 102 and opening at the other end to a horizontal passage 112. Passage 112 interconnects the chamber 109 and a vertical passage 113 leading to the flexible pipe 99 and thus to the cylinders 92. The outlet from chamber 109 is a horizontal passage 114, controlled at one end by valve 103, and opening at the other end into a passage 115 which extends vertically through block 100. When valve 102 is opened, valve 103 is closed, and liquid supplied to chamber 107 passes by way of passages 111, 112 and 113 to pipe 99 and thence to the cylinders 92. When valve 102 is closed to cut off the supply of pressure liquid to cylinders 92, valve 103 will be open and liquid from the cylinders 92 can exhaust through pipe 99 and passages 113, 112, chamber 109, and passages 114 and 115.

Pressure liquid is supplied to the upper end of the passage 110 of the first unit by a pipe 116 (Figs. 1 and 2). The lower end of the passage 110 of this unit is connected to the lower end of the passage 110 of the second unit by a pipe 117 and other pipes 117 interconnect the passages 110 of all the other units in series relation. Similarly, the exhaust passages 115 of all the units are connected in series, by pipes 118, and the lower end of the passage 115 of the first unit is connected to an exhaust pipe 119. The upper end of passage 110 and the lower end of passage 115 of the last unit of the series are of course suitably and permanently closed.

The other control valves for the press are contained within a block 120 (Figs. 1 and 2) suitably fixed to one of the plates 35. This block has two laterally-spaced passages 121 and 122 (Fig. 7) extending horizontally therethrough. To the left hand end of the passages 121 and 122 are connected supply and exhaust pipes 123 and 124 respectively, and to the right hand ends thereof are connected the described pipes 116 and 119 respectively. Fig. 7 shows the valve control for the left hand end of the cylinder 25. A vertical passage 125 leads from the level of passages 121 and 122 downwardly to the bottom of the block 120, where it connects with a pipe 126, which as shown in Fig. 2, leads to the left hand end of cylinder 25. A branch passage 127, controlled by a valve 128, leads from exhaust passage 122 to passage 125. A branch passage 129, controlled by a valve 130, leads from pressure passage 121 to passage 125. A similar arrangement is provided for the right hand end of cylinder 25, the pressure and exhaust valves being marked 131 and 132 in Figs. 1 and 2. These valves control the connection of the supply and exhaust to a pipe 133 which leads to the right hand end of cylinder 25. By opening valves 130 and 132 and closing valves 128 and 131, liquid under pressure will be admitted to the left hand end of cylinder 25 and exhausted from the right hand end thereof, whereby the ram will be moved to the right to press the material in the press chambers 55. By closing valves 130 and 132 and opening valves 128 and 131, liquid under pressure will be admitted to the right hand end of the cylinder 25 and exhausted from the left hand end thereof to move the ram on its return stroke to the left back into the illustrated position for the purpose of separating the plates 52, preparatory to dropping out the pressed cakes.

In the block 120, a pressure valve 134 and an exhaust valve 135 are provided for controlling the supply and exhaust to a pipe 136 which leads to the above described manifold 89. By opening valve 134 and closing valve 135, liquid under pressure will be admitted to the manifold and thus to all the cylinders 80. By closing valve 134 and opening valve 135, liquid will be exhausted from said cylinder.

The operation of the press will next be described. Assuming that the parts occupy the relative positions shown in Fig. 3, the press is conditioned for filling. The plates 52 of the several press units have been drawn back by the ram and with them the plungers 53, which stand retracted in rings 54. The links 42 and 45 limit the extent to which adjacent plates can be separated. Liquid under pressure has been admitted to the cylinders 80 and the pistons 81 are projected, as shown in Fig. 6, whereby each ring 54 is forced under hydraulic pressure toward the plate 52 of the next unit to clamp the filter pad therebetween and effectively close and seal its press chamber 55. The valve 69 is then opened and liquid is pumped into the several press chambers through the passage 68 and the interconnecting passages 67. During the pumping of liquor into the press chambers, some of the cocoa butter will flow through the filter pads 60 and out of the press chambers 55 through the perforations 57 and through the grooves 58 and 59. Pumping is continued until a sufficient cake-forming mass has been built up within the rings 54. Then pumping is stopped and valve 69 is closed. The ram 27, 28 is then moved to the right, as viewed in Figs. 1 and 3 by the pressure of liquid admitted to the left hand end of cylinder 25. Such movement of the ram forces the plungers 53 inwardly in their respective rings and additional cocoa butter is expressed from the mass within the chambers—such butter leaving through the filter pads and passages above described.

After this pressing operation has been completed, liquid is admitted to the right hand end of cylinder 25 and the left hand end thereof is connected to exhaust, whereby the ram is moved to the left. Such movement of the ram causes the several press units to be successively separated. The ring of each unit, because of the frictional hold of the pressed cocoa cake within it, moves with the plate and plunger of its unit and is moved away from the plate of the next succeeding unit. The plate 52' with its plunger 53 and the ring 54 thereon, move back with the ram until all the slack in the first pair of links 45 is taken up. Then the hook ends 49 of those links engage and move the next plate of the series, carrying along the plunger and ring of the second press unit. On continued movement of the ram to the left, the hook ends 48 of the first pair of links 42 will eventually engage and move the third plate of the series and so on until each linkage is drawn taut and all the plates 52 are uniformly spaced in the predetermined relationship shown in Fig. 3.

Pressure liquid is then admitted to the cylinders 92, one pair at a time, by operation of the valve control handle 106. Each handle is opened and then immediately closed. The effect is that the pistons 93 force each ring 54 back over its plunger into completely telescoped relation therewith, enabling the pressed cocoa cake to drop. The handles 106 may be operated in quick succession and the cakes drop one after another in quick succession.

An alternative method of operation is to operate the ram far enough to take up the slack in the first pair of links 45 and then operate the handle 106 of the first unit to telescope the ring of the first unit over its plunger and allow the first cake to drop; then the ram is drawn back until the slack is taken up in the first pair of links 42 and the second handle 106 is operated to cause the ring of the second unit to telescope over its plunger and drop the second cake; and so on, until all the rings have been telescoped and all the cakes dropped.

After all the pressed cakes have been dropped from the press, the plates of the press are left in the spaced relationship shown in Fig. 3, but the rings 54 remain in completely telescoped relation with their plungers. Pressure liquid is then admitted simultaneously to all the cylinders 80 and the pistons 81 thereof force the rings 54 back into the illustrated positions and close the several press chambers 55, in readiness for a succeeding filling operation.

It is to be noted that the passages 67 and that part of passage 68, which lies between valve 69 and the press chamber 55 of the last unit of the series, will be filled with plugs of pressed cocoa. These plugs will be removed on the next filling operation, being forced out of their passages by the pressure of the entering liquid and deposited in the press chambers 55 to become mixed with the liquid pumped into such chambers. The described passages are preferably tapered, as shown, to facilitate removal of the plugs.

Each ring 54 or that portion thereof in which the pressed cake lies, is also preferably tapered, as indicated in Fig. 5, to facilitate the telescoping movement of the ring.

The two sets of hydraulic jacks have been disclosed as controlled in two different ways. That is, the jacks for telescoping the rings and dropping the cakes, have been shown as controlled by individual valve units, one for each press unit, while the jacks for shifting the rings back and closing the press chambers, have been shown as controlled by a single valve unit, whereby all may be operated simultaneously. Obviously, either form of control may be used for either or both sets of jacks, if desired, although the arrangement illustrated is the one at present deemed preferable.

In presses of this type, it has been customary heretofore to make use of spacing fingers, insertable one between the plate and ring of each unit, and to close the press chambers by pressure of the ram transmitted through the plate and fingers to the ring—the fingers preventing relative movement of the plungers and rings at such time while each ring is forced against the plate of the next unit. After the filling operation has been completed, it is necessary to withdraw these spacing fingers to enable the ensuing pressing operation. Before the fingers can be withdrawn, the pressure of the ram must be relaxed and, when this occurs, there is a chance for leakage from the press chambers 55. The described arrangement provides an effective spacing means—the pistons 81—which also function independently of the ram to close and seal the press chambers. An important advantage of this arrangement is that the pressure which maintains the press chambers closed and sealed need not be relaxed preparatory to the pressing operation and a sealing pressure is continuously maintained from the start of the filling operation until the end of the pressing operation.

I claim:

1. In a press, having a hydraulic ram and a resistance head, a series of plunger-bearing plates mounted in column formation between said head and ram, a series of rings each forming within it a press chamber and interposed one between each pair of plates, each ring slidably receiving one of said plungers, said ram being operable on movement toward the head to move said plates toward one another and force the plungers into their rings and releasable to enable said plates to be moved back into predetermined spaced relation, means for filling the chambers while said plates are in said spaced relation, hydraulic means including a cylinder and piston operable independently of the ram for forcing the rings against the plates to close and seal the several press chambers during the filling of said chambers, said ram on its movement toward said head acting in opposition to said hydraulic means and causing the piston to be forced into its cylinder, and pressure-limiting means operable to relieve excess pressure in said hydraulic means as the ram moves toward said head while maintaining continuously an effective sealing pressure between the rings and plates.

2. In a press, a hydraulic ram and a resistance head, a series of press units mounted in column formation between the ram and head; each unit including a ring forming within it a press chamber, a plunger slidably fitting in said ring and closing one end of the chamber, and a plate to one face of which the plunger is fixed; the other end of each chamber adapted to be closed and sealed solely by the engagement of one end face of the ring with the adjacent end face of the plate of the next succeeding unit, means for filling said chambers, said ram operable when moved toward said head to force said plungers into said rings and compress the material in said press chambers, hydraulically operable means acting between each ring and the plunger-bearing face of the plate of its unit to space the ring and plate apart and hold the plunger retracted in the press chamber and also operable to force the ring against the plate of the next unit to engage the end faces thereof and close and seal the chamber, means to supply liquid under pressure to said last-named means including a by-pass effective when the ram moves toward its head to relieve excess pressure and enable the plungers to move into their rings, whereby a rigid spacing between the rings and their plates is maintained during filling of the chambers and the spacing means yields only when the material is being compressed in said chambers and whereby pressure is continuously maintained to hold the press chambers closed and sealed during both the filling of the chambers and the pressing of the material therein.

3. In a press, having pressure and resistance heads interconnected by a pair of laterally spaced tie bars, a cylinder in the pressure head and a ram operating in said cylinder, together with a series of press units mounted in coaxial relation and in column form between the ram and resistance head and slidably supported from said bars; each unit comprising a ring and a plate having a plunger slidably engaged in the ring, trackways provided one on each of said bars, a series of links for interconnecting said plates and limiting the extent of separation thereof but enabling movement of the plates toward one another, there being one such series on each trackway and alternate links of each series resting directly on and slidable on the trackway and the other links of the series each resting on and partially overlapping two links therebelow and slidable relatively thereto, the end links of each series being connected one to said ram and one to said resistance head and said plates having lugs which overlie and rest upon the upper links of each series, whereby the weight of the plates is distributed through an upper link and two underlying links to the trackway.

4. In a press, having pressure and resistance heads interconnected by a pair of laterally spaced tie bars, a cylinder in the pressure head and a ram operating in said cylinder, together with a series of press units mounted in coaxial relation and in column form between the ram and resistance head and slidably supported from said bars; each unit comprising a ring and a plate having a plunger slidably engaged in the ring, trackways provided one on each of said bars, a series of links for interconnecting said plates and limiting the extent of separation thereof but enabling movement of the plates toward one another, there being one such series on each trackway and alternate links of each series resting directly on and slidable on the trackway and the other links of the series each resting on and partially overlapping two links therebelow and slidable relatively thereto, the end links of each series being connected one to said ram and one to said resistance head and said plates having lugs which overlie and rest upon the upper links of each series, whereby the weight of the plates is distributed through an upper link and two underlying links to the trackway, a second trackway provided on each tie bar adjacent the first-named trackway, and lugs on opposite sides of each ring slidably supported one on each of the second-named trackways.

5. In a press, having a hydraulic ram and a resistance head, a series of plunger-bearing plates mounted in column formation between said head and ram, a series of rings each forming within it a press chamber and interposed one between each pair of plates, each ring slidably receiving one of said plungers, said ram being operable on movement toward the head to move said plates toward one another and force the plungers into their rings and releasable to enable said plates to be moved back into predetermined spaced relation, means for filling the chambers while said plates are in said spaced relation, hydraulic means including a cylinder and piston operable independently of the ram for forcing the rings against the plates to close and seal the several press chambers during the filling of said chambers, said ram on its movement toward said head acting in opposition to said hydraulic means and causing the piston to be forced into its cylinder, a control valve to admit liquid under pressure to the cylinder of said hydraulic means, a control valve to admit liquid under pressure to said ram, a common supply pipe to which both valves are connected to receive liquid under pressure from the same source, a conduit from the first valve to the cylinder of said means, and a conduit from the second valve to said ram, whereby when both valves are opened and the ram in said movement forces said piston into its cylinder the liquid driven out of said cylinder can return to said supply pipe.

6. In a press, having a hydraulic ram and a resistance head, a series of plunger-bearing plates mounted in column formation between said head and ram, a series of rings each forming within it a press chamber and interposed one between each pair of plates, each ring slidably receiving one of said plungers, said ram being operable on movement toward the head to move said plates toward one another and force the plungers into their rings and releasable to enable said plates to be moved back into predetermined spaced relation, means for filling the chambers while said plates are in said spaced relation, hydraulic means operable independently of the ram for simultaneously forcing all the rings against their respective plates to close the several press chambers and maintain each of them closed under uniform pressure, and means for equalizing the unit pressure acting on said hydraulic means and that acting on the ram during that movement of the ram which forces the plungers into their respective rings.

7. In a press, having a hydraulic ram and a resistance head, a series of plates each having fixed to one face thereof a plunger, said plates mounted in a predetermined spaced relationship in the form of a column between said head and ram, a series of rings interposed one between each pair of adjacent plates and each slidably receiving a plunger, each ring forming within it a press chamber closed at one end by one plate of its pair and at the other end by the plunger of the other plate of its pair, means for limiting the extent of separation of each plate and rigidly holding each pair of plates from further separation when in said relationship, means for filling said chamber while the plates are in said relationship, said ram when operated moving toward said head shortening said column and forcing all the plungers into their respective rings, each plate and ring moving by different distances increasing from a minimum adjacent said head to a maximum adjacent said ram, sets of hydraulic jacks one set for each ring and each set consisting of a plurality of jacks, the jacks of each set being interposed between their ring and the plunger-bearing face of one of the pair of plates between which said ring is interposed and operable to move the ring toward the other plate of its pair to close the press chamber and operable to space the plates of its pair into said relationship and to hold them pressed against said limiting means, said jacks operating in opposition to the ram and preventing movement of the plungers in the rings during the filling of said chambers, means for supplying liquid under pressure from a common source simultaneously to all said jacks, whereby all act with equal force, said ram when operated to shorten the column overpowering the jacks, and means whereby to prevent undue pressure rise in said jacks during operation of said ram and to maintain continuously a uniform minimum pressure in each jack to maintain the press chambers closed, said jacks being bodily movable with the rings and each set moving bodily a different distance during shortening of the column under operation of the ram.

8. In a press, having a hydraulic ram and a resistance head, a series of plates each having fixed to one face thereof a plunger, said plates mounted in a predetermined spaced relationship in the form of a column between said head and ram, a series of rings interposed one between each pair of adjacent plates and each slidably receiving a plunger, each ring forming within it a press chamber closed at one end by one plate of its pair and at the other end by the plunger of the other plate of its pair, means for limiting the extent of separation of each plate and rigidly holding each pair of plates from further separation when in said relationship, means for filling said chamber while the plates are in said relationship, said ram when operated moving toward said head shortening said column and forcing all the plungers into their respective rings, each plate and ring moving by different distances increasing from a minimum adjacent said head to a maximum adjacent said ram, sets of hydraulic jacks one set for each ring and each set consisting of a plurality of jacks, the jacks of each set being interposed between their ring and the plunger-bearing face of one of the pair of plates between which said ring is interposed and operable to move the ring toward the other plate of its pair to close the press chamber and operable to space the plates of its pair into said relationship and to hold them pressed against said limiting means, said jacks operating in opposition to the ram and preventing movement of the plungers in the rings during the filling of said chambers, means for supplying liquid under pressure from a common source simultaneously to all said jacks, whereby all act with equal force, said ram when operated to shorten the column overpowering the jacks, and means whereby to prevent undue pressure rise in said jacks during operation of said ram and to maintain continuously a uniform minimum pressure in each jack to maintain the press chambers closed, said jacks being bodily movable with the rings and each set moving bodily a different distance during shortening of the column under operation of the ram, and other sets of hydraulic jacks one set for each ring and each set consisting of a plurality of jacks bodily movable with its ring, the jacks of each set being interposed between the ring and the non-plunger-bearing face of one of the two plates between which it is interposed and acting oppositely to the first sets of jacks, said second-named jacks operable when said plates are in said relationship and the first-named jacks are released to move the rings back over their plungers to open the press chambers.

9. In a press having a hydraulic ram and a resistance head, a series of plunger-bearing plates mounted in column formation between said head and ram, a series of rings each forming within it a press chamber and interposed one between each pair of plates, each ring slidably receiving one of said plungers, said ram being operable on movement toward the head to move said plates toward one another and force the plungers into their rings and releasable to allow said plates to be moved back into predetermined spaced relation, a set consisting of a plurality of hydraulic jacks carried by each ring, the jacks of each ring acting against the plunger-bearing face of one of its pair of plates to force the ring into abutment with the non-plunger-bearing face of the other of its pair of plates to close and seal the press chamber, means for forcing liquid under pressure into the press chambers for filling the same while said plates are in said spaced relation, said jacks maintaining the plates in said relation and preventing relative movement of the plungers and rings against the filling pressure, a second set consisting of a plurality of jacks carried by each ring, the jacks of each last-named set acting against the non-plunger bearing face of one of its pair of plates to force its ring into telescoped relation with its plunger and into abutment with the other of its pair of plates, each jack of each set comprising a cylinder formed in its ring parallel with the axis of the ring and opening to one end face of its ring, a cylinder head closing said open end and a piston slidable in said cylinder and through the head, said heads projecting beyond the end face of the ring and each plate having recesses to receive the heads.

ALONZO LINTON BAUSMAN.